No. 855,312.
PATENTED MAY 28, 1907.
J. A. HIGDON.
GRAIN DRIER.
APPLICATION FILED OCT. 17, 1906.
2 SHEETS—SHEET 2.
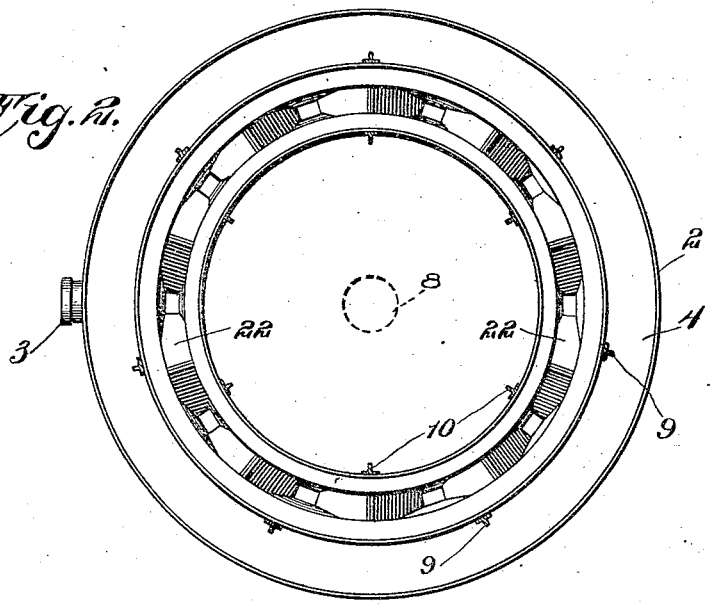
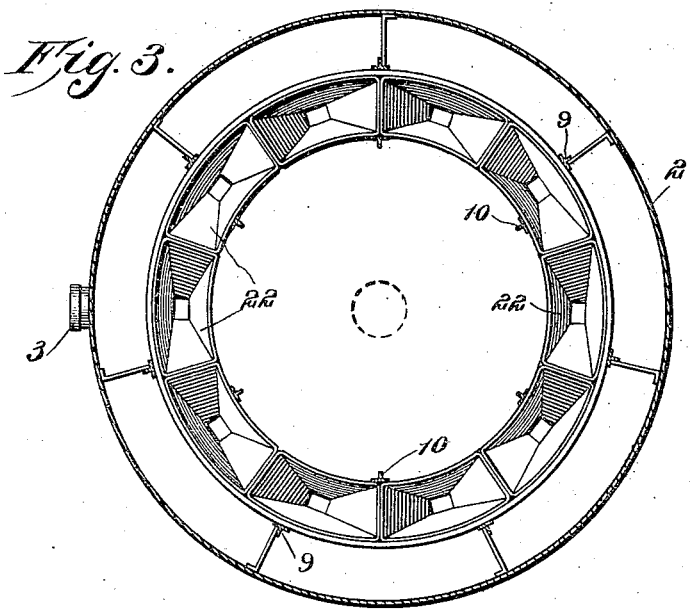
Witnesses
Louis R. Heinrichs
F. J. Elmore
Inventor
Joseph A. Higdon,
By Victor J. Evans
Attorney

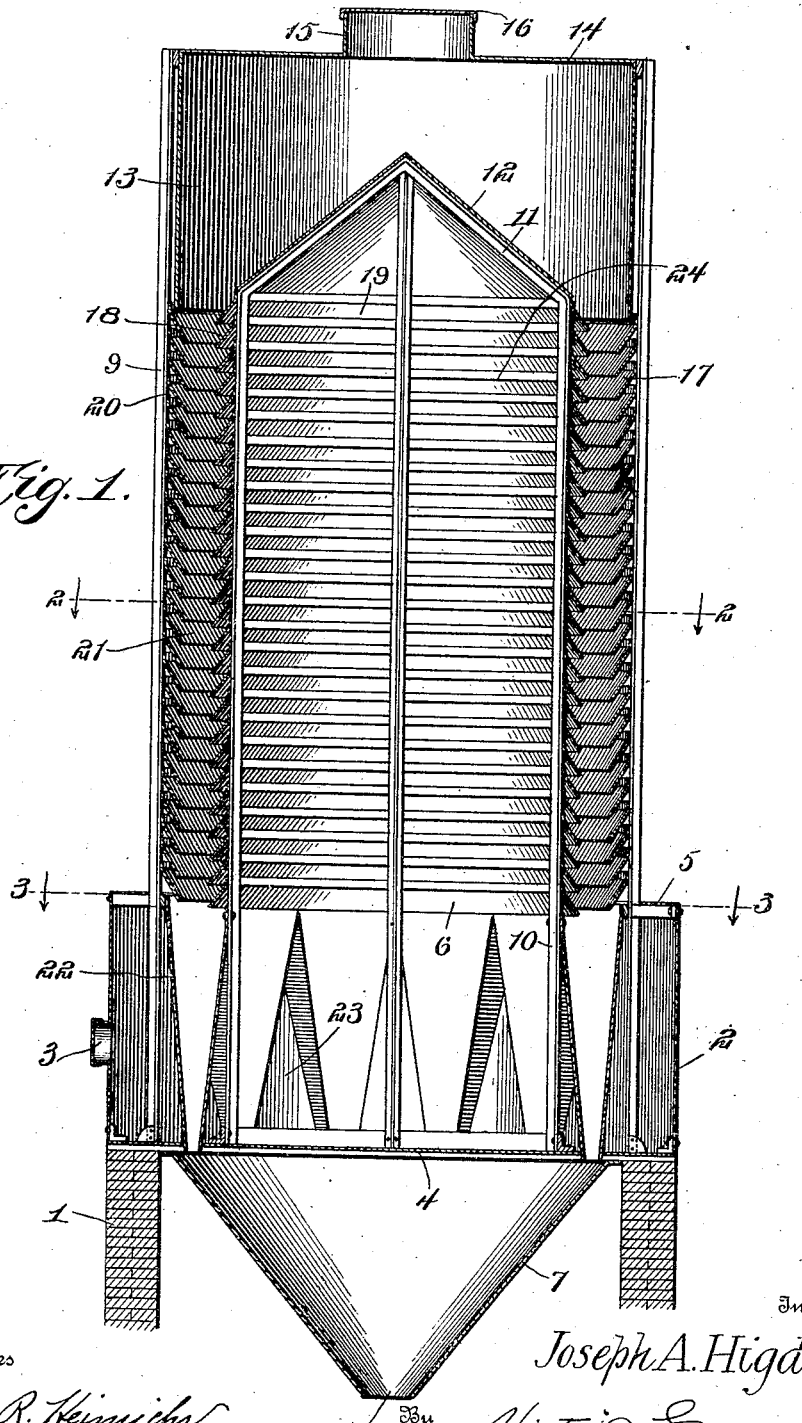

UNITED STATES PATENT OFFICE.

JOSEPH A. HIGDON, OF HENDERSON, KENTUCKY.

GRAIN-DRIER.

No. 855,312.  Specification of Letters Patent.  Patented May 28, 1907.

Application filed October 17, 1906. Serial No. 339,405.

*To all whom it may concern:*

Be it known that I, JOSEPH A. HIGDON, a citizen of the United States, residing at Henderson, in the county of Henderson and State of Kentucky, have invented new and useful Improvements in Grain-Driers, of which the following is a specification.

This invention relates to driers of the type employed in connection with fans and steam coils for drying and curing grain and has for its objects to provide a comparatively simple, inexpensive device of this character wherein the air will circulate freely through the center of the drier, and be driven outward through the wall of grain, thus effectually drying the latter, and one in which the dried grain will be directed into the underlying hopper for delivery into conveyers or elevators.

With these and other objects in view, the invention comprises the novel features of construction and combination of parts more fully hereinafter described.

In the accompanying drawings: Figure 1 is a vertical section taken centrally and longitudinally through a drier embodying the invention. Fig. 2 is a horizontal section taken on the line 2—2 of Fig. 1. Fig. 3 is a similar view taken on the line 3—3 of Fig. 1.

Referring to the drawings, 1 designates a foundation on which is supported an air drum 2 provided with an inlet opening 3 and having a lower head 4 in the form of an iron plate arranged on the foundation, and an upper head 5, the latter being provided with an enlarged central opening 6, while attached beneath the head 4 is a trunco-conical hopper 7 having a discharge opening 8.

Fixed at their lower ends and arising vertically from the head 4 is a plurality of outer frame members or bars 9 and a series of inner frame members or bars 10, which, together with the bars 9, are composed preferably of T-iron, the frame members 10 being angularly bent at their upper ends as at 11, with their terminals meeting at a common central point or apex and forming an upper framework on which is seated a downwardly inclined conical deflecting member or cap 12, while attached to the upper ends of the outer frame members 9 and to inclose the cap 12 is a cylindrical hood 13 having an open lower end and provided at the center of its end wall 14 with an inlet mouth 15 centered above the deflector 12.

The body of the drier comprises an outer louvered wall composed of a series of downwardly and inwardly inclined conical sections or rings 17, attached to the uprights 9, and an inner louvered wall consisting of a series of conical rings or sections 18 disposed concentrically within the ring 17 and attached to the uprights 10, the rings composing the walls being spaced vertically to provide the air passages 19 and 20 leading transversely outward through the body, while formed between the walls and throughout the length of the body proper, is an annular space 21 designed to receive the wall of grain or other material to be dried and disposed to communicate at its lower open end with the upper enlarged ends of a series of tapered spouts or ducts 22 extending vertically through the drum 2 and in turn discharging at their lower ends into the hopper 7. The spouts 22, which are arranged in juxtaposition wholly around the drum and are connected at their ends in the heads 4 and 5, are wholly free from communication with the interior of the drum and are of tapered form, thus producing between them air passages 23 through which and the opening 6 the air within the drum may flow freely to an internal air chamber 24 formed centrally within the body of the drier and over the upper end of which the deflector cap 12 is arranged.

In practice, the grain to be dried is introduced into the device through the inlet mouth 15 until the grain-receiving space 21 has been filled. The air is then admitted into the drum 2 through the inlet opening 3 and passes through the spaces 23 and enlarged opening 6 upward into the air chamber 24 from which it escapes through the passages 19 and 20 outward through the wall of grain within the space 21, thus effectually drying the material. The material, after being thoroughly dried, is discharged at the lower open end of the grain space 20 into the spouts or ducts 22 and thence to the hopper 7, from which it is delivered through the opening 8 into conveyers or elevators. It will be noted that the grain, when it is introduced into the opening 15, falls on the apex of the deflector 12 by which it is scattered and properly directed into the space 21.

Having thus described my invention, what I claim is:

1. A drier of the type described comprising a body portion consisting of inner and outer louvered walls having a grain-receiving space between them and provided with air passages leading outward through said space, an air drum arranged beneath the body, and a spout or duct extended through the drum and communicating at its upper end with the lower end of the grain space.

2. A drier of the type described comprising a body portion consisting of inner and outer louvered walls having a grain-receiving space between them, and provided with air passages leading outward through said space, an air-tight drum arranged beneath and having communication with the interior of the body and a series of spouts or ducts extended through the drum and communicating at their upper ends with the lower end of the grain space.

3. A drier of the type described comprising a body consisting of inner and outer louvered walls having a grain-receiving space between them, said body being provided with an inner air chamber and having passages leading from said chamber outward through the grain space, a deflector cap arranged over the air chamber for directing the material into said space, an air-tight drum sustained beneath the body and having communication with the air chamber, and a plurality of spouts or ducts extended through the drum and communicating at their upper ends with the lower end of the grain space.

In testimony whereof, I affix my signature in presence of two witnesses.

JOSEPH A. HIGDON.

Witnesses:
R. S. EASTIN,
C. LANGLEY WILLIAMS.